(12) United States Patent
Thompson

(10) Patent No.: US 6,423,258 B1
(45) Date of Patent: Jul. 23, 2002

(54) MACHINE AND METHOD FOR PROVIDING FOLDED PIPE LINERS

(75) Inventor: Mark Thompson, Marysville, OH (US)

(73) Assignee: American Pipe & Plastics, Inc., New York, NY (US)

( * ) Notice: Subject to any disclaimer, the term of this patent is extended or adjusted under 35 U.S.C. 154(b) by 10 days.

(21) Appl. No.: 09/629,174

(22) Filed: Jul. 31, 2000

(51) Int. Cl.⁷ ............................ B29C 53/08; B29C 63/26
(52) U.S. Cl. .................. 264/285; 264/36.16; 264/322; 425/11; 425/182; 425/343; 425/385
(58) Field of Search .................. 264/285, 269, 264/516, 36.16, 319, 322, 323, 339; 425/11, 343, 182, 385, 335, 392; 156/287, 294

(56) References Cited

U.S. PATENT DOCUMENTS

| | | | |
|---|---|---|---|
| 4,009,063 A | 2/1977 | Wood | 156/71 |
| 4,064,211 A | 12/1977 | Wood | 264/95 |
| 4,135,958 A | 1/1979 | Wood | 156/199 |
| 4,207,130 A | 6/1980 | Barber | 156/244.13 |
| 4,385,885 A | 5/1983 | Wood | 425/387.1 |
| 4,390,574 A | 6/1983 | Wood | 428/36 |
| 4,401,696 A | 8/1983 | Wood | 427/236 |
| 4,429,720 A | 2/1984 | Beck et al. | 138/97 |
| 4,434,115 A | 2/1984 | Chick | 264/36 |
| 4,439,469 A | 3/1984 | Wood | 427/230 |
| 4,581,085 A | 4/1986 | Wood | 156/156 |
| 4,581,247 A | 4/1986 | Wood | 427/53.1 |
| 4,602,974 A | 7/1986 | Wood et al. | 156/287 |
| 4,622,196 A | 11/1986 | Wood | 264/229 |
| 4,626,133 A | 12/1986 | Waring | 405/107 |
| 4,637,754 A | 1/1987 | Wood | 405/150 |
| 4,655,638 A | 4/1987 | Waring | 405/107 |
| 4,668,125 A | 5/1987 | Long, Jr. | 405/154 |
| 4,680,066 A | 7/1987 | Wood | 156/156 |
| 4,685,983 A | 8/1987 | Long, Jr. | 156/64 |
| 4,752,511 A | 6/1988 | Driver | 428/36 |
| 4,758,454 A | 7/1988 | Wood | 428/36 |
| 4,776,370 A | 10/1988 | Long, Jr. | 138/98 |
| 4,778,553 A | 10/1988 | Wood | 156/287 |
| 4,786,345 A | 11/1988 | Wood | 156/156 |
| 4,836,715 A | 6/1989 | Wood | 405/150 |
| 4,863,365 A | 9/1989 | Ledoux et al. | 425/343 |
| 4,867,921 A | 9/1989 | Steketee, Jr. | 264/36 |
| 4,980,116 A | 12/1990 | Driver | 264/516 |
| 4,985,196 A | 1/1991 | Ledoux et al. | 264/516 |
| 4,991,006 A | 2/1991 | Wood | 358/100 |
| 4,998,871 A | 3/1991 | Ledoux | 425/140 |
| 5,034,180 A | 7/1991 | Steketee, Jr. | 264/516 |
| 5,044,405 A | 9/1991 | Driver et al. | 138/98 |
| 5,091,137 A | 2/1992 | Ledoux | 264/516 |

(List continued on next page.)

FOREIGN PATENT DOCUMENTS

GB 2 227 543 * 8/1990

* cited by examiner

Primary Examiner—Mathieu D. Vargot
(74) Attorney, Agent, or Firm—Miles & Stockbridge P.C.

(57) ABSTRACT

A machine and method for providing a folded liner for insertion into a pipe, comprises an upper section and a lower section. A flattened heated thermoplastic liner is fed downwardly through the upper section to the lower section, where it is redirected and fed substantially horizontally from the lower section. The flattened liner introduced to the upper section is broadly indented at one side of the liner and is then more acutely indented to provide loops disposed side-by-side in a substantially horizontal direction. The lower section reorients the loops so that they are stacked side-by-side in a substantially vertical direction. The liner is cooled as its leaves the lower section to maintain its cross-sectional configuration. The upper section is separable from the lower section, and portions of the upper and lower sections are displaceable and removable to facilitate insertion of the liner into the machine and removal of the machine from the liner.

26 Claims, 7 Drawing Sheets

U.S. PATENT DOCUMENTS

| | | | | |
|---|---|---|---|---|
| 5,092,756 | A | 3/1992 | Gau et al. | 425/343 |
| 5,108,533 | A | 4/1992 | Long, Jr. et al. | 156/294 |
| 5,114,634 | A | 5/1992 | McMillan et al. | 264/28 |
| 5,213,727 | A | 5/1993 | Gargiulo | 264/40.3 |
| 5,244,624 | A | 9/1993 | Steketee, Jr. | 264/516 |
| 5,256,342 | A | 10/1993 | McMillan et al. | 264/28 |
| 5,273,414 | A | 12/1993 | Gargiulo | 425/59 |
| 5,285,741 | A | 2/1994 | Askin | 112/262.2 |
| 5,342,570 | A | 8/1994 | Ledoux et al. | 264/566 |
| 5,346,658 | A | 9/1994 | Gargiulo | 264/40.3 |
| 5,368,809 | A | 11/1994 | Steketee, Jr. | 264/516 |
| 5,374,174 | A | 12/1994 | Long, Jr. | 425/11 |
| 5,384,086 | A | 1/1995 | Smith | 264/516 |
| 5,385,173 | A | 1/1995 | Gargiulo | 138/98 |
| 5,393,481 | A | 2/1995 | Wood | 264/516 |
| 5,397,513 | A | 3/1995 | Steketee, Jr. | 264/36 |
| 5,403,120 | A | 4/1995 | Stekette, Jr. | 405/154 |
| 5,407,630 | A | 4/1995 | Smith | 264/516 |
| 5,409,561 | A | 4/1995 | Wood | 156/287 |
| 5,447,665 | A | 9/1995 | Steketee, Jr. | 264/36 |
| 5,487,411 | A | 1/1996 | Goncalves | 138/98 |
| 5,510,078 | A | 4/1996 | Smith et al. | 264/516 |
| 5,525,049 | A | 6/1996 | Paletta | 425/62 |
| 5,546,992 | A | 8/1996 | Chick et al. | 138/98 |
| 5,577,864 | A | 11/1996 | Wood et al. | 405/154 |
| 5,587,126 | A | 12/1996 | Steketee, Jr. | 264/568 |
| 5,589,131 | A | 12/1996 | Steketee, Jr. | 264/568 |
| 5,624,629 | A | 4/1997 | Wood | 264/516 |
| 5,656,117 | A | 8/1997 | Wood et al. | 156/287 |
| 5,671,778 | A | 9/1997 | Sakuragi et al. | 138/97 |
| 5,706,861 | A | 1/1998 | Wood et al. | 138/98 |
| 5,736,166 | A | 4/1998 | Polivka | 425/11 |
| 5,778,938 | A | 7/1998 | Chick et al. | 138/98 |
| 5,810,053 | A | 9/1998 | Mandich | 138/98 |
| 5,816,293 | A | 10/1998 | Kiest, Jr. | 138/98 |
| 5,861,116 | A | 1/1999 | Mandich | 264/35 |
| 5,934,332 | A | 8/1999 | Rodriguez et al. | 138/98 |
| 5,971,029 | A | 10/1999 | Smith et al. | 138/98 |
| 5,975,878 | A | 11/1999 | Wood et al. | 425/503 |

MACHINE AND METHOD FOR PROVIDING FOLDED PIPE LINERS

BACKGROUND OF THE INVENTION

This invention is concerned with lining of sewer pipes and the like and is more particularly concerned with providing a folded liner that can be pulled through a pipe for later expansion by conventional techniques.

Because of the expense of repairing and/or replacing defective sewer pipes and the like, an industry practice has developed in which the pipes are lined with a plastic liner, thereby to provide a new flow path within the defective pipe. In order to facilitate the pulling of the liner through the pipe, techniques have been developed for folding a flattened thermoplastic liner before it is introduced to the pipe so that the cross-dimensions of the liner, when folded, are substantially less than the cross-dimensions of the pipe. However, providing a folded liner efficiently, reliably, and economically has been a problem. The present invention is a solution to that problem.

BRIEF DESCRIPTION OF THE INVENTION

In a broad sense, the invention concerns a machine and method of providing tubing that is folded about a longitudinal axis whereby the cross-section of the tubing assumes a configuration comprising overlapping loops. More particularly, the loops are formed as the tubing is fed in a first direction, and then the tubing is redirected and the orientation of the loops is changed.

In a preferred embodiment, a machine of the invention comprises an upper section and a lower section, which are preferably separable. As a heated flexible liner of flattened cross-section is fed into and through the upper section to the lower section, it is broadly indented at one side thereof and is then more acutely indented to fold the liner so that the cross-section assumes a configuration in which a pair of outer loops are disposed at opposite sides of a central loop along a substantially horizontal direction.

As the folded liner is fed through the lower section, it is redirected so that it is fed substantially horizontally, with the cross-sectional loops stacked substantially vertically. The liner fed from the lower section is cooled to reduce its flexibility, so that the cross-sectional configuration is maintained as the liner is drawn into and through a pipe, in a conventional manner.

In a preferred embodiment of the invention, portions of the upper and lower sections can be displaced, and can also be removed, to facilitate initial entry of the liner into the upper section, and also to facilitate withdrawal of the machine from the liner after the liner has been drawn to a desired position in the pipe. After the liner has been installed in the pipe, and the machine withdrawn, a trailing portion of the liner can be cut and the liner can be heated and expanded by conventional techniques, thereby unfolding the liner and providing a round cross-section.

BRIEF DESCRIPTION OF THE DRAWINGS

The invention will be further described in conjunction with the accompanying drawings, which illustrate a preferred and exemplary (best mode) embodiment of the invention and wherein.

DETAILED DESCRIPTION OF THE INVENTION

Figure 8:
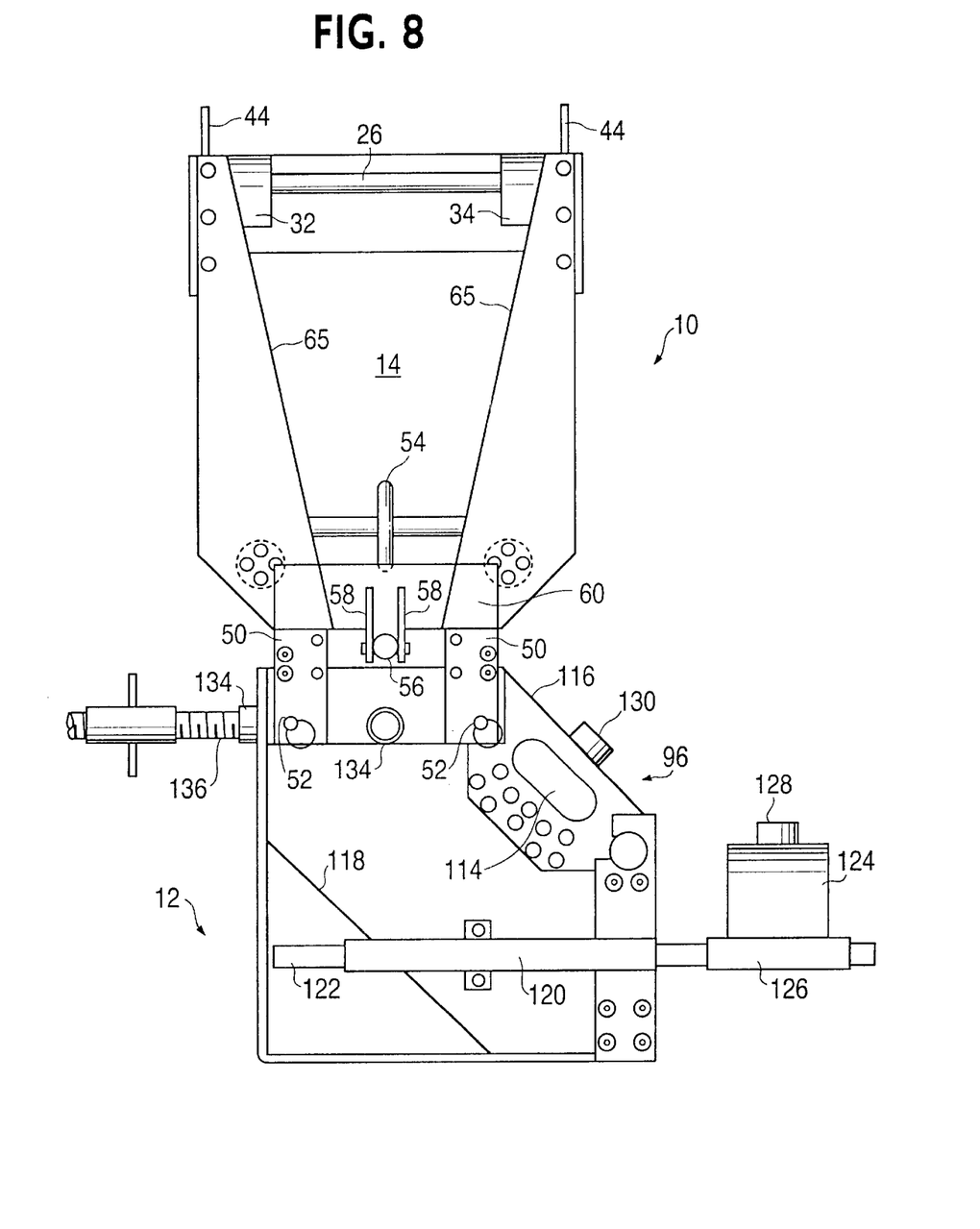
FIG. 8 is a side elevation view showing the upper section assembled on the lower section.
Figure 9:
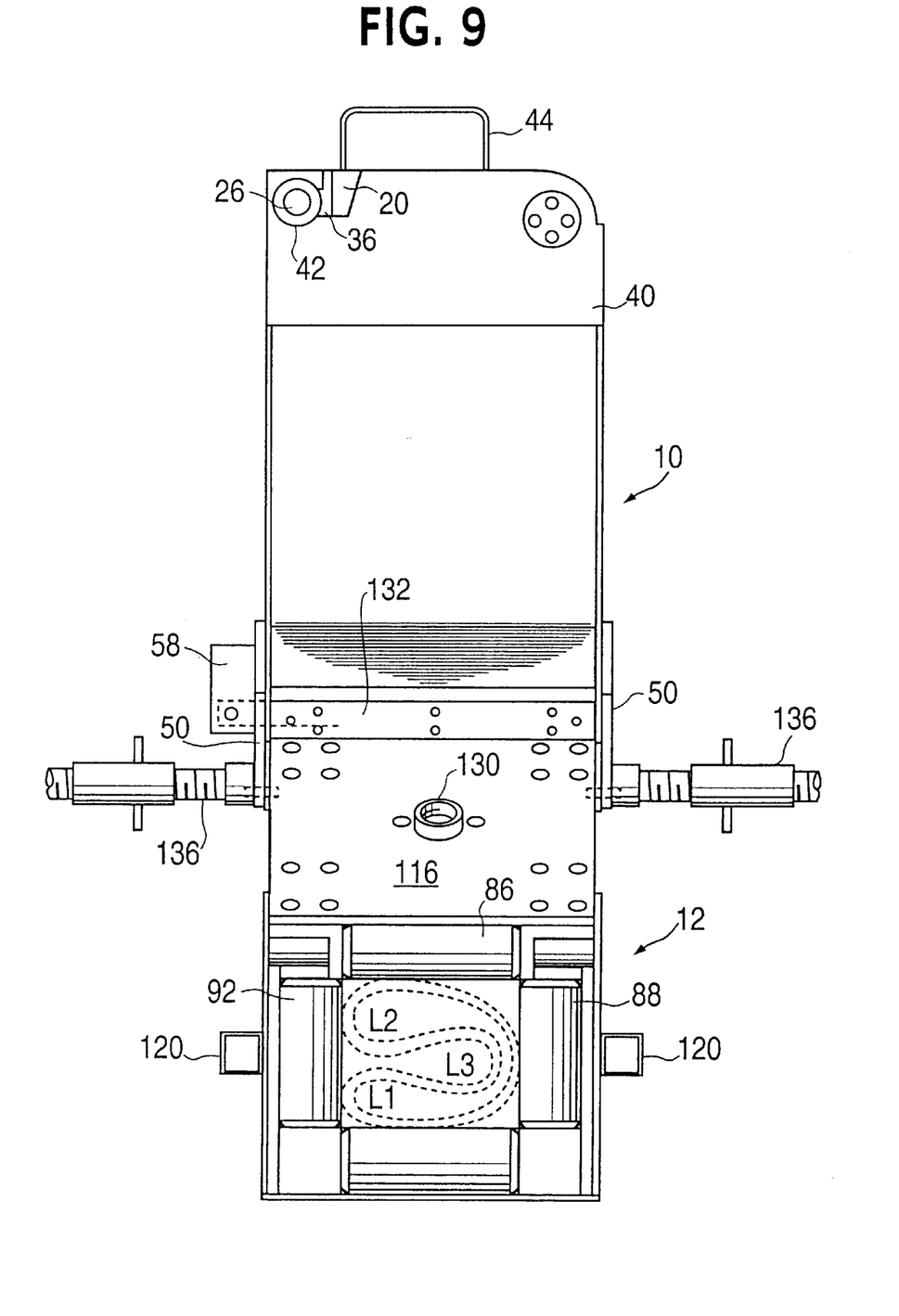
FIG. 9 is an end view of the machine shown in FIG. 8, illustrating the cross-sectional configuration of the folded liner as it leaves the lower section.

As shown in FIGS. 8 and 9, a machine in accordance with the invention comprises an upper section 10 mounted on a lower section 12. The upper section, shown more particularly, in FIGS. 1–4, comprises a casing 14 that is open at the top and at one side thereof. A portion 16 of the upper section, shown in FIG. 2, is displaceable and can be removed from the remainder of the upper section. Removable portion 16 comprises a pair of side plates 18, 20 supporting a convex, bulbous forming roller 22 that is mounted rotatably on the side plates.

An end plate 24 connects the side plates and supports a rod 26 with ends 28, 30 that project from a pair of mounting brackets 32, 34 attached to the end plate. The projecting ends of the rod are received within L-shaped slots 36 in sidewalls 38, 40 of the upper section, the sidewalls being notched to receive the side plates of the removable portion 16. Washers 42 (FIGS. 1 and 9) may be attached to the projecting ends of the rod 26.

Figure 1:
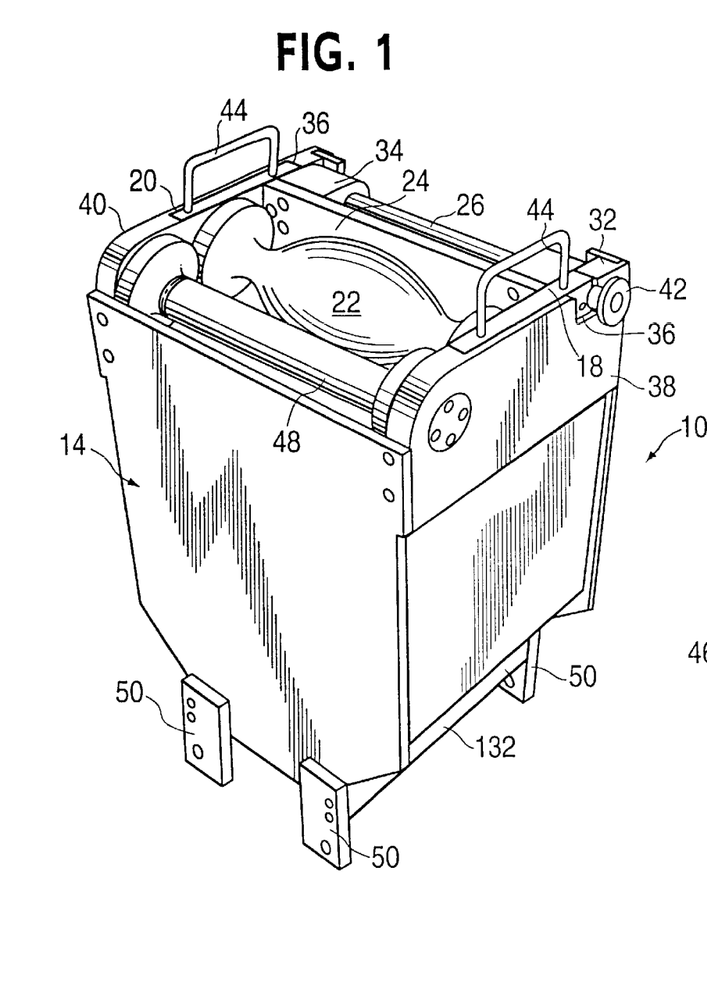
FIG. 1 is a perspective view of the upper section.
Figure 2:
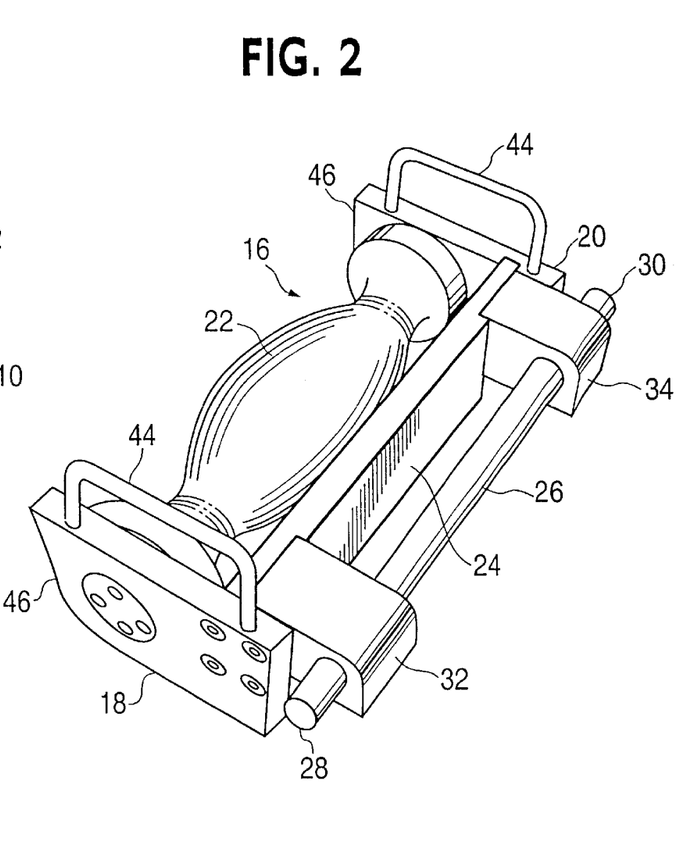
FIG. 2 is a perspective view of a removable portion of the upper section.
Figure 4:
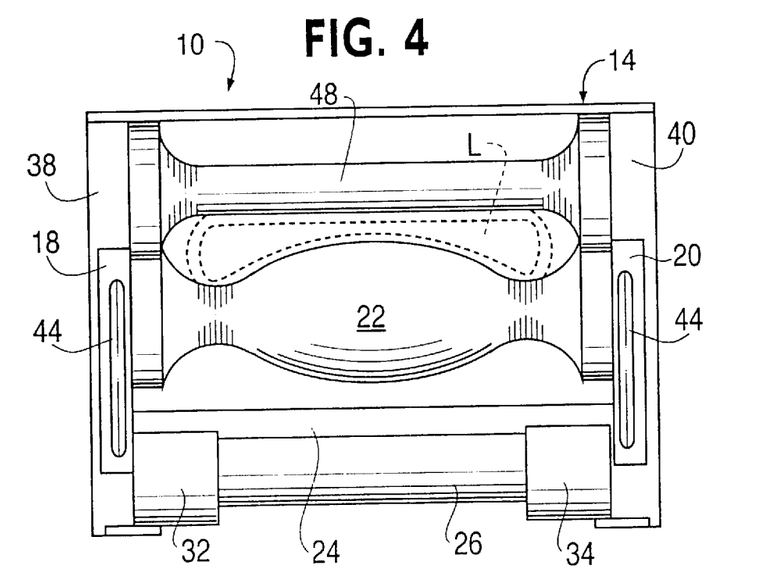
FIG. 4 is a top plan view of the upper section showing the cross-sectional configuration of the liner as it is broadly indented.

Handles 44 are mounted on the side plates of the removable portion so that the removable portion can be easily turned and lifted from the position shown in FIG. 1. The ends 46 of the side plates, opposite to the projecting ends of the rod 26, are curved, and the juxtaposed surfaces of the sidewalls 38 and 40 have a complementary curvature, so that the removable portion can be turned about the axis of the rod and then shifted along slots 36 and lifted out of the slots. As shown in FIGS. 1 and 4, a cylindrical backup roller 48 is rotatably supported on the sidewalls of the upper section in close proximity with the forming roller 22.

Four rectangular plates 50 are attached to and extend downwardly from a bottom portion of the upper section to embrace a top portion of the lower section 12 as shown in FIGS. 8 and 9. Removable pins 52 are inserted into aligned bores in the plates and the juxtaposed walls of the lower section.

Figure 3:
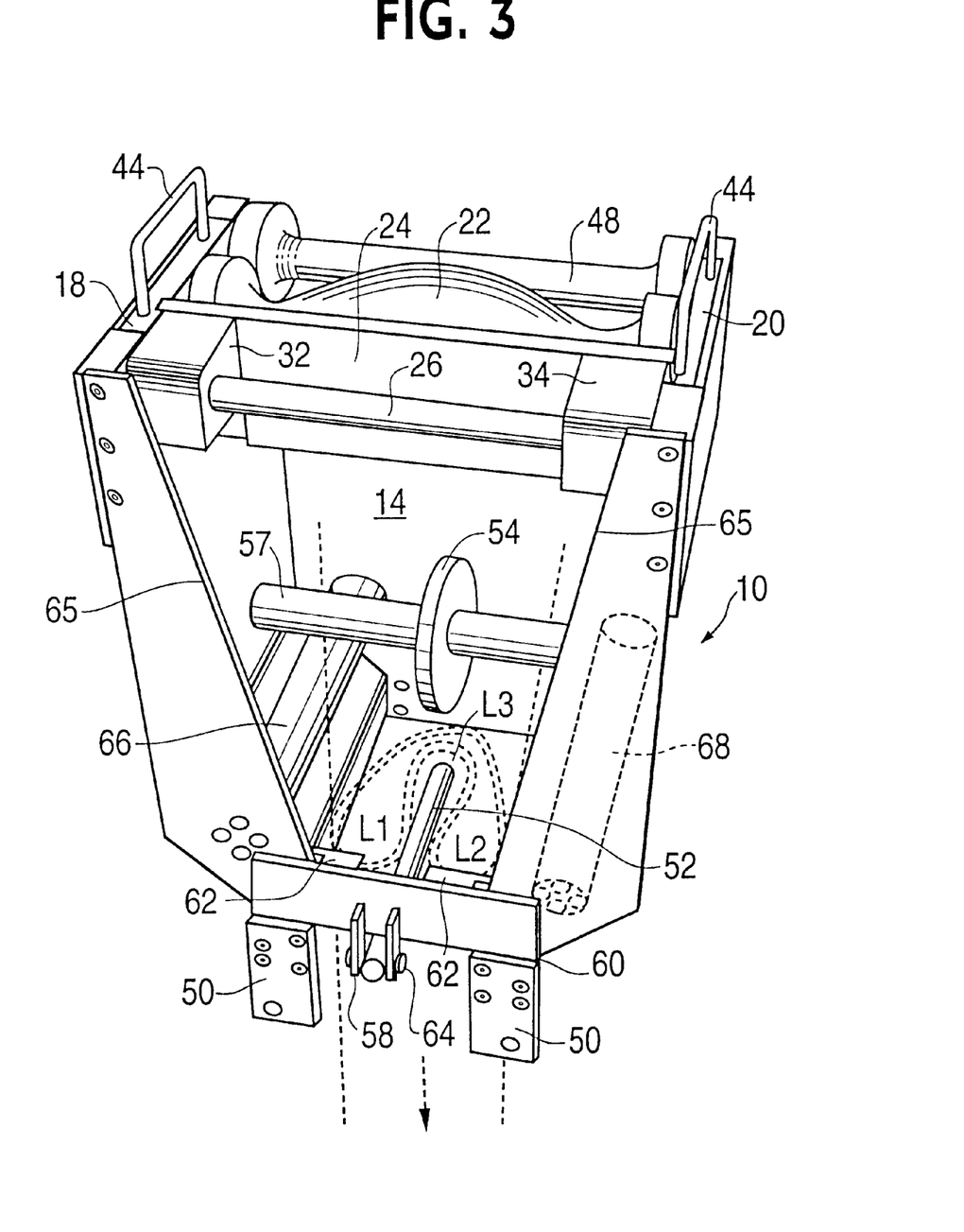
FIG. 3 is a further perspective view of the upper section showing components that are not visible in FIG. 1 and showing the cross-sectional configuration of the liner after folding.

As shown in FIGS. 3 and 8, the upper section includes an indenting assembly, which, in the preferred form comprises a rotatable disk 54 and a cylindrical finger 56 that projects substantially horizontally into the interior of the upper section below the disk. The disk is supported on a shaft 57 extending between sidewalls of the upper section and removable therefrom. The finger is supported on a pair of brackets 58 attached to a plate 60 having channel pieces 62 that slide along converging edges 65 of an opening at one side of the upper section. When installed in the upper section, the plate 60 rests atop two mounting plates 50 as shown in FIG. 3. The cylindrical finger 56 is supported on the brackets 58 by a pin 64 that extends through aligned bores in the brackets and an end portion of the finger, and the mounting of the finger is such that, when sufficient manual force is exerted, the finger can be turned downwardly from the position shown in FIG. 3.

The forming roller 22 and the backup roller 48 rotate about substantially horizontal axes. Preferably, there are two additional rollers, 66, 68 (see FIG. 3), below and at opposite sides of the indenting assembly, that rotate about substantially horizontal axes transverse to the rotational axes of the forming roller and the backup roller.

Figure 5:
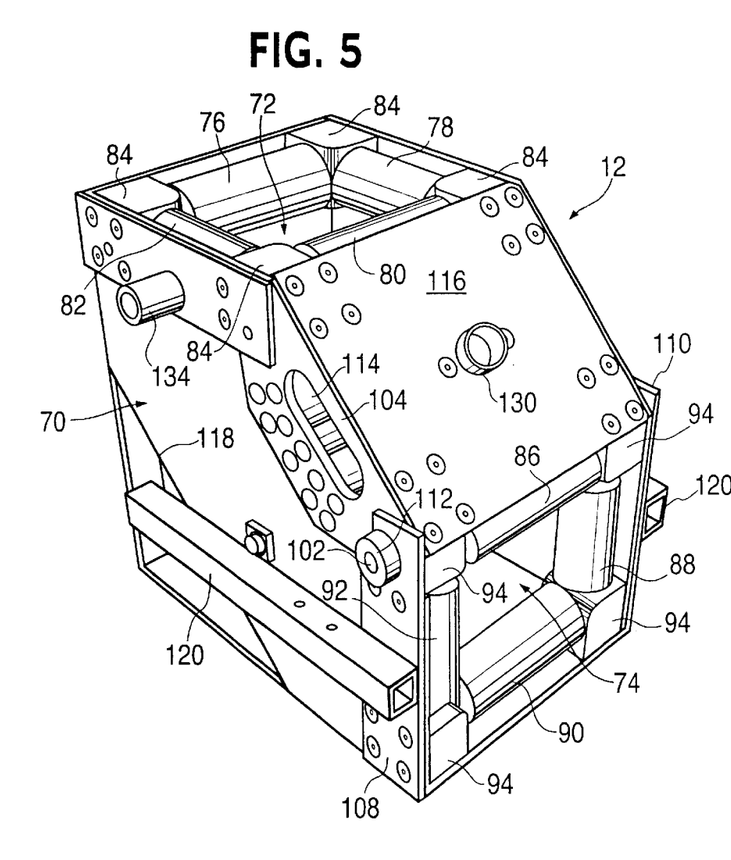
FIG. 5 is a perspective view of the lower section.

As shown in FIG. 5, the lower section 12 comprises a casing 70 with a rectangular inlet 72 at the top and a rectangular outlet 74 at one end. The inlet is defined by four rollers 76, 78, 80, and 82 that rotate on corner blocks 84 about substantially horizontal axes. The outlet 74 is defined by four rollers 86, 88, 90, and 92 that rotate on corner blocks 94. One pair of opposed rollers, 86, 90, rotates about substantially horizontal axes and the other pair of opposed rollers, 88, 92, rotates about substantially vertical axes. The corner blocks 94 shown at the top of rollers 88 and 92 in FIG. 5 are actually formed in two parts. Portions 95 of these corner blocks are shown in FIG. 7, and mating portions 97 are shown in FIG. 6.

Figure 6:
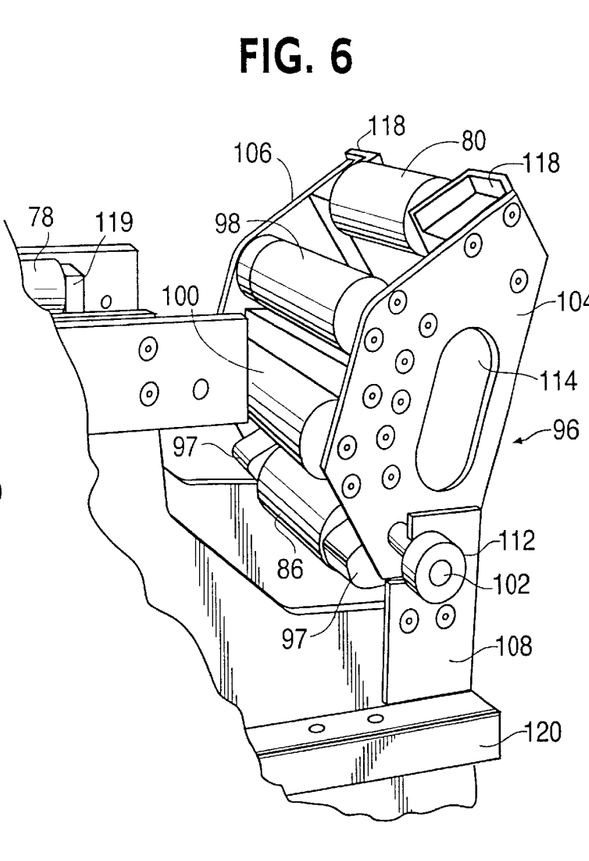
FIG. 6 is a fragmentary perspective view showing displacement of a removable portion of the lower section.

As shown in FIG. 6, the lower section 12 has a displaceable and removable portion 96 that supports one of the rollers, 80, of the inlet 72 and one of the rollers, 86, of the outlet 74, as well as two additional rollers 98, 100 that are rotatable about substantially horizontal axes. Short rods 102, one of which is shown in FIG. 6, project from side plates 104 and 106 of the removable portion 96 and are received in slots 107 (FIG. 7) in sidewall portions 108 and 110 of the lower section. The ends of the projecting rods may have washers 112 fixed thereto.

Openings 114 in the side plates of the removable portion provide hand grips to permit the removable portion to be turned from the position shown in FIG. 5 to the position shown in FIG. 6, whereupon the projecting rods 102 can be displaced from their slots 107 so that the removable portion can be removed from the lower section. The lower section will then appear as shown in FIG. 7. The removable portion 96 has a cover plate 116 that closes off the lower section above the outlet 74 when the removable portion is in the position shown in FIG. 5. In this position angle pieces 118 shown in FIG. 6 mate with plates 119 to form the corner blocks 84 adjacent to the plate 116.

Figure 7:
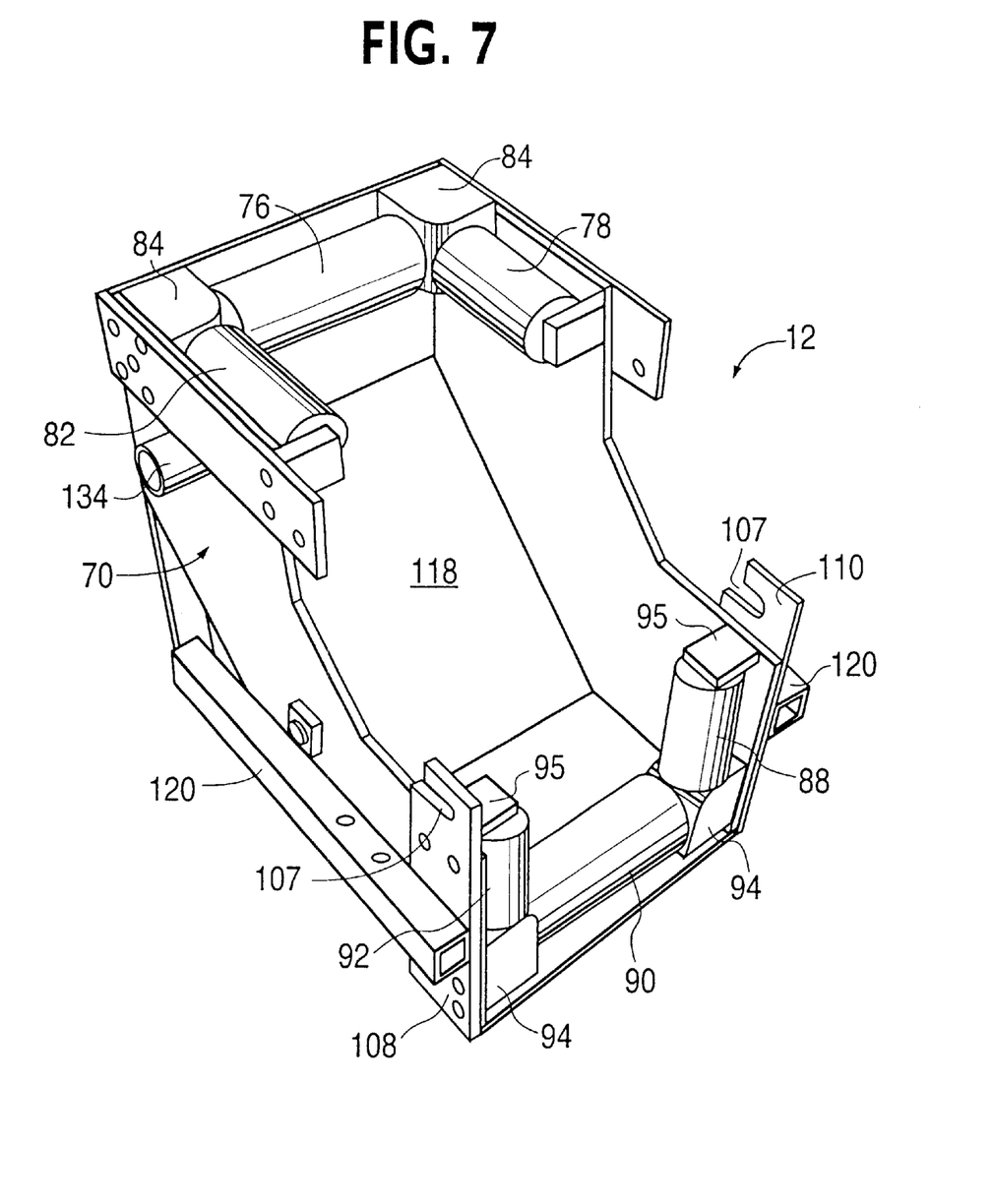
FIG. 7 is a perspective view showing the lower section with the removable portion of FIG. 6 removed.

As shown in FIGS. 5, 7, and 8, the lower section 12 has an inclined plane defined by a sloping wall 118 (or, alternatively, by a series of rollers), angulated at approximately 45° with respect to horizontal. The rollers 98 and 100 of the removable portion are opposed to the sloping wall 118 and define a tangent plane that is substantially parallel to the sloping wall.

As shown in FIGS. 5–9, a pair of rectangular cross section tubes 120 are attached to opposite sides of the lower section. Rectangular cross-section rods 122, one of which is shown in FIG. 8, can be inserted through the tubes so as to project from opposite ends thereof and can be fixed in position in the tubes by inserting pins (not shown) through aligned bores in juxtaposed walls of the rods and the tubes. The projecting ends can serve as handles for lifting and lowering the lower section.

Figure 10:
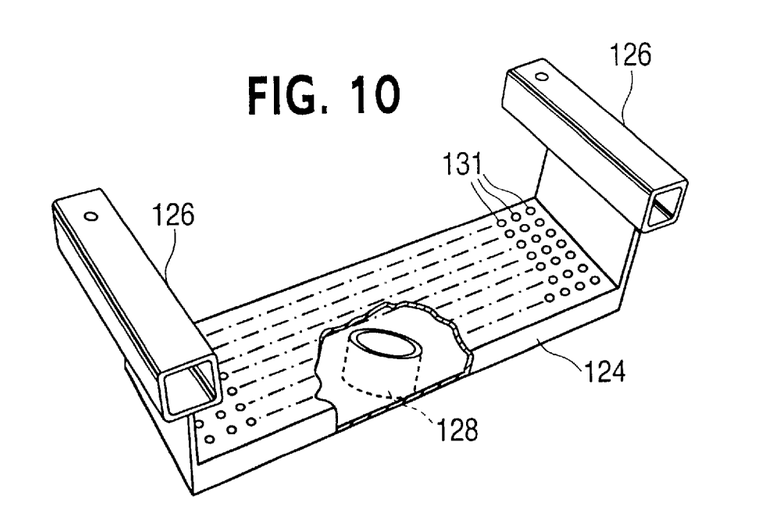
FIG. 10 is an inverted perspective view of a cooling manifold that can be used in the invention.

Projecting ends of the rods 122 also serve to support a cooling manifold 124, the base of which has rectangular cross-section tubes 126 that receive respective rod ends and that are pinned in position. A threaded fitting 128 at the top of the manifold is provided so that a hose can be attached to the manifold to supply cooling water. A similar fitting 130 provided on the cover plate 116 of the removable portion as shown in FIGS. 5, 8 and 9, can be connected to a hose for additional cooling if desired. FIG. 10 is an inverted view of the manifold showing a plurality of holes 131 through which water is ejected. A baffle or baffles (not shown) can be provided in the manifold to distribute the supply of water evenly to all of the holes.

To assemble the upper section 10 with the lower section 12 as shown in FIGS. 8 and 9, the upper section is lowered onto the top of the lower section until bars 132, one of which is shown in FIG. 1, that extend between pairs of plates 50 rest on corner blocks 84 at the top of the lower section. The pins 52 (FIG. 8) are then inserted, as described earlier, to lock the upper section to the lower section. The lower section has projecting tubulations 134 for receiving jack screws 136, the purpose of which will be apparent in the following description.

A typical application of the invention to provide a folded plastic liner in a sewer pipe will now be described.

It is well known in the art to pull a folded thermoplastic liner through a sewer pipe or the like by a pulling cable that is attached to a leading end of the liner. The coupling between the cable and the liner may include a ball and a swivel. The flattened liner may be supplied from a reel on which the liner is wound, the reel being placed in a steam cabinet to soften the thermoplastic liner material prior to its being fed into the machine of the invention. The machine of the invention can be installed below ground in a manhole, supported on a ledge directly or with intermediate support members and can be braced in position by means of the jack screws 136. The top of the upper section 10 is positioned below the ground level opening to the manhole, and the outlet 74 of the lower section 12 is aligned with an entry opening of the sewer pipe.

To facilitate insertion of the cable pulling assembly and the leading end of the liner into the upper section, the removable portion 16 of the upper section can be removed, or simply turned out of the way. After the pulling assembly and the leading end of the liner have been drawn through the machine of the invention, the removable portion of the upper section is returned to its home position shown in FIG. 1. Installation of the machine of the invention in the manhole is simplified by the separability of the upper and lower sections, so that the lower section can be installed in the manhole first and then the upper section installed atop the lower section.

The liner fed downwardly into the upper section has a flattened elongated cross-section L that passes between the bulbous forming roller 22 and the backup roller 48 as shown in FIG. 4. The forming roller forms a broad indentation in one side of the liner cross-section. This indentation becomes much more acute as it passes the indenting assembly comprising the rotating disk 54 and the finger 56, as shown in FIG. 3, so that the liner is folded about a longitudinal axis at a central region and defines a pair of outer loops L1 and L2 disposed at opposite sides of a central loop L3, with loop cross-sections arranged side-by-side in a substantially horizontal direction. As shown, the central loop L3 is open at one side of the liner and provides a longitudinal groove facing one side of the machine, into which the disk 54 and the finger 56 are inserted. The indenting assembly may, in certain applications, have a different construction from the rotating disk 54 and the finger 56, comprising only the disk or the finger, for example. The forming roller 22 has been found to be particularly effective in initiating the folding of the liner and in smoothing out dimples or other imperfections in the heated liner.

The folded liner fed downwardly from the upper section 10 into the lower section 12 impinges on the sloping wall 118 of the lower section, which redirects the liner so that it is fed substantially horizontally from the outlet 74 of the lower section, with the outer loops L1 and L2 disposed above and below the central loop L3, with the loop cross-sections arranged side-by-side in a substantially vertical direction and with the longitudinal groove provided by the open loop L3 facing the same side of the machine as in the upper section, as shown in FIG. 9. As the folded liner leaves the lower section it is cooled by cooling water supplied to the cooling manifold 124 to reduce the flexibility of the liner in order that its folded configuration can be maintained as the liner is pulled through the sewer pipe to the desired extent.

When a liner is pulled, it may tend to shift or twist undesirably. The combination of the forming roller 22 and the backup roller 48 are effective to establish the desired initial orientation of the liner, and the various rollers employed in the lower section are effective in guiding the liner and preventing undesired shifting and twisting.

When the liner pulling is complete, it is necessary to remove the machine from the liner. The construction of the machine of the invention greatly facilitates such removal. The removable portion 16 of the upper section can be removed, and the indenting assembly removed, so that the upper section can then be lifted and shifted laterally of the liner to pass the liner between the edges 65 in FIG. 3, thereby to separate the upper section from the liner and permit the upper section to be extracted from the manhole. Then the removable portion 96 of the lower section can be removed, so that the top and one side of the lower section are open as shown in FIG. 7. The lower section can then be shifted and lifted to separate it from the liner and to extract it from the manhole.

A trailing portion of the liner above ground can then be cut so that the installation of the liner can be completed using conventional techniques to soften and expand the liner to the desired round cross-section.

While a preferred embodiment of the invention has been shown and described, it will be apparent to those skilled in the art that modifications can be made without departing from the principles and spirit of the invention as defined in the appended claims. For example, the machine of the invention can be used above ground, rather than in a manhole, and can be used to provide folded tubing in applications other than sewer pipe lining. Furthermore, terms such as "substantially vertical" and "substantially horizontal" are relative terms used herein in describing preferred orientation of axes, for example, and the redirection of the liner from the upper section through the lower section, but it is to be understood that the liner feed need not be along strictly vertical or horizontal directions. For example, the liner fed from the lower section can be provided to a sloping pipe, which, within the context of the invention, is to be considered as "substantially horizontal".

The invention claimed is:

1. A machine for supplying a folded liner to a pipe, comprising:
    an upper section that folds a flattened tubular liner about a longitudinal axis to form overlapping loops having cross-sections that are disposed side-by-side in a first direction as the liner is fed downwardly through the upper section; and
    a lower section that receives the folded liner from the upper section and that redirects the liner so that the liner is fed from the lower section with the cross-sections of the same loops disposed side-by-side in a second direction.

2. A machine according to claim 1, wherein the first direction is substantially horizontal and the second direction is substantially vertical.

3. A machine according to claim 1, wherein the upper section is separable from the lower section.

4. A machine according to claim 1, wherein the upper section has a bulbous forming roller that engages the liner as the liner is fed through the upper section and that provides a broad indentation of the flattened liner at one side thereof.

5. A machine according to claim 4, wherein the upper section has a backup roller adjacent to the forming roller for backing up the opposite side of the liner.

6. A machine according to claim 4, wherein the upper section folds the broadly indented liner acutely to form three overlapping loops, one of which is a central loop open at one side of the liner to provide a longitudinal groove, and wherein the upper section has an indenting assembly including a portion inserted in the groove.

7. A machine according to claim 6, wherein the portion of the indenting assembly comprises a disk that rotates about a substantially horizontal axis.

8. A machine according to claim 6, wherein the portion of the indenting assembly comprises a finger that projects substantially horizontally into the upper section.

9. A machine according to claim 6, wherein the portion of the indenting assembly comprises a disk that rotates about a substantially horizontal axis and a finger below the disk that projects into the upper section.

10. A machine according to claim 4, wherein the forming roller is mounted on a portion of the upper section that is removable.

11. A machine according to claim 6, wherein the upper section has a pair of rollers below and at opposite sides of the indenting assembly that are rotatable about substantially horizontal axes that are transverse to the substantially horizontal axis of the forming roller.

12. A machine according to claim 1, wherein the lower section has an inclined plane on which the liner fed from the upper section impinges, to redirect the liner.

13. A machine according to claim 12, wherein the lower section has an inlet defined by a plurality of rollers supported for rotation about substantially horizontal axes and has an outlet defined by a plurality of rollers some of which are supported for rotation about substantially vertical axes and others of which are supported for rotation about substantially horizontal axes.

14. A machine according to claim 13, wherein the rollers defining the inlet are arranged in two pairs that define a rectangular inlet and the rollers of the outlet are arranged in two pairs that define a rectangular outlet.

15. A machine according to claim 14, wherein one of the rollers defining the inlet and one of the rollers defining the outlet are displaceable to open a side of the inlet and a side of the outlet.

16. A machine according to claim 15, wherein said one rollers are supported on a removable portion of the lower section that also supports additional rollers that rotate about substantially horizontal axes and that are arranged along a plane substantially parallel to the inclined plane.

17. A machine according to claim 12, wherein the lower section has a series of rollers that define a tangential plane parallel to the inclined plane.

18. A machine according to claim 1, further comprising a cooling unit for cooling the redirected liner that is fed from the lower section.

19. A method of providing folded tubing, comprising:

feeding, in a first feed direction, flexible tubing having a flattened cross-section;

folding the fed tubing to transform the tubing into overlapping loops having cross-sections disposed side-by-side in a first arrangement direction; and redirecting the fed tubing so that the loop cross-sections of the same loops are reoriented to be disposed side-by-side in a second arrangement direction.

20. A method according to claim 19, wherein the folding of the fed tubing is achieved by broadly indenting one side of the tubing and then more acutely indenting that side.

21. A method according to claim 19, wherein the redirecting is achieved by impinging the fed tubing upon an inclined plane that redirects the tubing so that it is fed in a second feed direction.

22. A method according to claim 21, wherein the tubing passes through an inlet before it impinges on the inclined plane and through an outlet after it impinges upon the inclined plane.

23. A method according to claim 22, wherein the tubing is cooled as it leaves the outlet.

24. A method according to claim 20, wherein a broad indentation is formed by a bulbous roller at one side of the tubing that is backed up by a roller at the opposite side of the tubing.

25. A method according to claim 24, wherein one of the rollers is moved relative to the other roller to facilitate insertion of the tubing between the rollers and removal of the tubing from between the rollers.

26. A method according to claim 22, wherein each of the inlet and outlet is defined by a group of rollers, some of said rollers being movable away from others of said rollers to provide the inlet and the outlet with open sides, and wherein the tubing is moved through the open sides of the inlet and the outlet.

* * * * *